(12) United States Patent
Abazid

(10) Patent No.: US 10,934,841 B2
(45) Date of Patent: Mar. 2, 2021

(54) TRANSMISSION ASSEMBLY FOR AN ENGINE

(71) Applicant: Mohammad Abazid, Amman (JO)

(72) Inventor: Mohammad Abazid, Amman (JO)

( * ) Notice: Subject to any disclaimer, the term of this patent is extended or adjusted under 35 U.S.C. 154(b) by 0 days.

(21) Appl. No.: 16/480,194

(22) PCT Filed: Jan. 22, 2018

(86) PCT No.: PCT/JO2018/050002
§ 371 (c)(1),
(2) Date: Jul. 23, 2019

(87) PCT Pub. No.: WO2018/138748
PCT Pub. Date: Aug. 2, 2018

(65) Prior Publication Data
US 2019/0368353 A1    Dec. 5, 2019

Related U.S. Application Data

(60) Provisional application No. 62/449,613, filed on Jan. 24, 2017.

(51) Int. Cl.
*F01B 9/02* (2006.01)
*F02B 75/00* (2006.01)
(Continued)

(52) U.S. Cl.
CPC .............. *F01B 9/02* (2013.01); *F02B 75/045* (2013.01); *F02B 75/32* (2013.01); *F02B 75/287* (2013.01); *F02G 1/044* (2013.01); *F16C 7/06* (2013.01)

(58) Field of Classification Search
CPC .......... F01B 9/02; F02B 75/045; F02B 75/32; F02B 75/287; F02G 1/044; F16C 7/06
See application file for complete search history.

(56) References Cited

U.S. PATENT DOCUMENTS

| | | | | |
|---|---|---|---|---|
| 4,266,443 A | * | 5/1981 | McWhorter | F02B 41/04 74/579 E |
| 4,567,866 A | * | 2/1986 | Schubert | F02B 41/04 123/197.1 |

(Continued)

FOREIGN PATENT DOCUMENTS

| CN | 205654433 U | 10/2016 |
|---|---|---|
| CN | 205663513 U | 10/2016 |

OTHER PUBLICATIONS

Austrian Patent Office; International Search Report & Written Opinion for PCT/JO2018/050002; 9 pages; dated Jan. 8, 2019; Vienna, AT.

*Primary Examiner* — Long T Tran
(74) *Attorney, Agent, or Firm* — Matheson Keys & Kordzik PLLC; Kelly Kordzik

(57) ABSTRACT

There is provided an assembly for an engine configured for linking a piston to a crankshaft (6) of the engine, comprising a pair of primary connecting rods (1a, 1b) configured to link said piston (1) to a secondary connecting rod (2), the secondary connecting rod (2) comprises an upper portion (2a) and a lower portion (2b); a controlling member (3) having a pair of opposed guiding rails (3a, 3b) and a pair of aligned lateral pin joints (30a, 30b), the controlling member (3) is configured to receive a substantial part of the upper portion (2a) of said secondary connecting rod (2); and a controlling member (3) support element configured to enclose the controlling member (3) within a cylinder block (5) of said engine, wherein the secondary connecting rod upper (2a) and lower portions (2b) are connected to each other when a crank shaft joint (8) is trapped between two semi-circular space gaps (28) in each of said secondary connecting rod upper (2a) and lower (2b) portions.

14 Claims, 13 Drawing Sheets

(51) Int. Cl.
  *F02B 75/04* (2006.01)
  *F02B 75/32* (2006.01)
  *F02B 75/28* (2006.01)
  *F02G 1/044* (2006.01)
  *F16C 7/06* (2006.01)

(56) References Cited

U.S. PATENT DOCUMENTS

| | | | | |
|---|---|---|---|---|
| 4,957,069 | A * | 9/1990 | Mederer | F01B 9/02 |
| | | | | 123/197.3 |
| 5,865,092 | A * | 2/1999 | Woudwyk | F02B 75/30 |
| | | | | 123/48 B |
| 6,202,622 | B1 * | 3/2001 | Raquiza, Jr. | F02B 75/32 |
| | | | | 123/197.4 |
| 6,857,401 | B1 * | 2/2005 | Styron | F02B 75/045 |
| | | | | 123/48 B |
| 9,243,556 | B2 | 1/2016 | Abazid | |
| 10,487,729 | B1 * | 11/2019 | Choi | F02B 75/047 |
| 2002/0043226 | A1 * | 4/2002 | Gofron | F01B 9/06 |
| | | | | 123/56.1 |
| 2002/0129778 | A1 * | 9/2002 | Bartsch | F02B 75/045 |
| | | | | 123/78 E |
| 2003/0116011 | A1 | 6/2003 | Tsai | |
| 2005/0150471 | A1 * | 7/2005 | Styron | F02B 75/045 |
| | | | | 123/48 B |
| 2014/0096740 | A1 * | 4/2014 | Schubert | F02B 41/04 |
| | | | | 123/197.3 |
| 2015/0053168 | A1 * | 2/2015 | Abazid | F02B 75/32 |
| | | | | 123/197.3 |
| 2015/0176483 | A1 * | 6/2015 | Matsuda | F02B 75/045 |
| | | | | 123/48 B |
| 2017/0114826 | A1 * | 4/2017 | Pienta | F02F 3/28 |
| 2017/0356335 | A1 * | 12/2017 | Ezaki | F16C 7/06 |
| 2018/0119611 | A1 * | 5/2018 | Riba | F16C 7/06 |
| 2018/0238382 | A1 * | 8/2018 | Huber | F16C 7/06 |
| 2018/0245508 | A1 * | 8/2018 | Tomoda | F16C 3/28 |

\* cited by examiner

TRANSMISSION ASSEMBLY FOR AN ENGINE

CROSS-REFERENCE TO RELATED APPLICATIONS

This application claims priority from the U.S. provisional patent application Ser. No. 62/449,613 filed on Jan. 24, 2017.

TECHNICAL FIELD

The present disclosure relates to an engine transmission assembly that transforms a linear reciprocating motion of a piston into an angular motion of a crankshaft.

BACKGROUND INFORMATION

Conventional engines generally include of three major cases: a cylinder head sitting on top of a cylinder block, and a crank case. The cylinder block includes a plurality of cylinders, each having a piston reciprocating there through. The cylinder block along with the cylinder head forms a combustion chamber where fuel is combusted to cause the reciprocation of the pistons. In such conventional engines, the crank case includes a crankshaft connected to the piston through a transmission assembly that transforms the reciprocating motion of the pistons to torsion of the crankshaft.

Conventional transmission assemblies in engines generally include a single connecting rod connected at one end to a piston head and to a crankshaft at the other end, wherein such assembly has only one degree-of-freedom.

SUMMARY

Therefore, it is an object of the present disclosure to provide a new assembly including moving and stationary parts, the assembly should transmit the reciprocating motion of an engine piston to a torsional motion of a crank shaft, allowing for better torque conversion near top dead center without compromising the engine dimensions.

As another object of the present disclosure, there is provided an assembly that can fit inside the cylinders of the engine and a set of confined dimensions of a conventional cylinder block without altering the position of the crankshaft, allowing the assembly of the present disclosure to be used in retrofitting existing engines.

Aspects of the present disclosure provide an assembly for an engine configured for linking a piston head to a crankshaft of the engine, the assembly may include:
  a primary connecting rod configured to hingeably connect to said piston head;
  a secondary connecting rod comprising an upper portion and a lower portion, wherein the upper portion is hingeably connected to said primary connecting rod;
  a controlling member having a pair of opposing guiding rails and a pair of aligned lateral pins, wherein the controlling member is configured to receive a substantial part of the upper portion of said secondary connecting rod; and
  a controlling member support element configured to enclose the controlling member within a cylinder block of said engine, the controlling member support element comprising two aligned lateral openings configured to receive the pair of aligned lateral pins of the controlling member, wherein the upper and lower portions of the secondary connecting rod are configured to engage a crank shaft joint between a circular opening formed by a mating of the upper and lower portions of said secondary connecting rod.

In some aspects, the upper portion of the secondary connecting rod may include an elongated member having a pin, wherein the pin may be inserted in an opening of the primary connecting rod.

In other aspects, the upper portion of the secondary connecting rod may include two vertical extrusions that form a first semi-circular space gap between said vertical extrusions, and wherein the lower portion of the secondary connecting rod may include two parallel vertical extrusions that form a second semi-circular space gap between said parallel vertical extrusions, wherein the first and second semi-circular space gaps form the circular opening when the upper and lower portions of the secondary connecting rod are mated.

In some aspects, the substantial part of the secondary connecting rod upper portion may be configured to slide inside said controlling member in a reciprocating motion.

In other aspects, each of the two aligned lateral openings of said controlling member support element may include a trapezoidal opening with a semi-circular cut formed in proximity of a middle point of a base of said trapezoidal opening.

In aspects of the present disclosure, the controlling member support element may further include a pair of fixing elements each having a trapezoidal shape with a semi-circular cut formed in proximity of a middle point of a base of said trapezoidal shape.

In some aspects, two circular openings may be formed when the fixing elements are inserted inside said lateral openings of the controlling member support element, wherein the circular openings may be configured to receive the pair of aligned lateral pins of said controlling member to form a pair of aligned lateral pin joints.

In aspects of the present disclosure, the circular openings of said controlling member support element and the pair of aligned lateral pin joints of the controlling member may be configured to allow for an oscillation of said controlling member.

In some aspects, the piston head, the primary connecting rod, the secondary connecting rod, the controlling member, the controlling member support element, and the crank shaft joint may be enclosed in an engine cylinder block.

In some aspects, the controlling member support element may further include a fixing mechanism configured to affix the controlling member support element inside said engine cylinder block.

In some aspects, wherein said fixing mechanism may include a bolt configured to be tightened against said engine cylinder block.

Other aspects of the present disclosure further provide an engine, which may include:
  a piston;
  a crankshaft; and
  a transmission assembly linking the piston to the crankshaft, wherein the transmission assembly comprises:
    a primary connecting rod, each with a first opening configured to hingeably connect to said piston;
    a secondary connecting rod comprising an upper portion and a lower portion, wherein the upper portion is hingeably connected to second openings of said pair of primary connecting rods;

a controlling member having a pair of opposing guiding rails and a pair of aligned lateral pins, wherein the controlling member is configured to receive a substantial part of the upper portion of said secondary connecting rod, wherein the substantial part of the upper portion of said secondary connecting rod is configured to slide inside said controlling member in a reciprocating motion; and a controlling member support element configured to enclose the controlling member within a cylinder block of said engine, the controlling member support element comprising two aligned lateral openings configured to receive the pair of aligned lateral pins of the controlling member, wherein the upper and lower portions of the secondary connecting rod may be configured to engage a joint of the crank shaft within a circular opening formed by a mating of the upper and lower portions of said secondary connecting rod, wherein the piston, the primary connecting rod, the secondary connecting rod, the controlling member, and the controlling member support element may be enclosed in the cylinder block of the engine.

In aspects of the present disclosure, the upper portion of the secondary connecting rod of the engine's transmission assembly may include an elongated member having a pair of aligned pins, wherein the pair of aligned pins is inserted in second openings of the pair of primary connecting rods, wherein the upper portion of the secondary connecting rod may include two vertical extrusions that form a first semi-circular space gap between said vertical extrusions, and wherein the lower portion of the secondary connecting rod may include two parallel vertical extrusions that form a second semi-circular space gap between said parallel vertical extrusions, wherein the first and second semi-circular space gaps may form the circular opening when the upper and lower portions of the secondary connecting rod are mated.

In accordance with aspects of the present disclosure, each of the two aligned lateral openings of said controlling member support element in the engine's transmission assembly may include a trapezoidal opening with a semi-circular cut formed in proximity of a middle point of a base of said trapezoidal opening, wherein the controlling member support element may further include a pair of fixing elements each having a trapezoidal shape with a semi-circular cut formed in proximity of a middle point of a base of said trapezoidal shape, wherein two circular openings may be formed when the fixing elements are inserted inside said lateral openings of the controlling member support element, wherein the circular openings may be configured to receive the pair of aligned lateral pins of said controlling member to form a pair of aligned lateral pin joints, wherein the circular openings of said controlling member support element and the pair of aligned lateral pin joints of the controlling member may be configured to allow for an oscillation of said controlling member.

In aspects of the engine of the present disclosure, the controlling member support element may further include a fixing mechanism configured to affix the controlling member support element inside the cylinder block of the engine.

Aspects of the present disclosure further provides a vehicle, which may include:
one or more wheels; and
an engine suitable for driving the one or more wheels of the vehicle, wherein the engine may include:
a piston;
a crankshaft; and a transmission assembly linking the piston to the crankshaft, wherein the transmission assembly comprises:
a primary connecting rod, each with a first opening configured to hingeably connect to said piston;
a secondary connecting rod comprising an upper portion and a lower portion, wherein the upper portion is hingeably connected to second openings of said pair of primary connecting rods;
a controlling member having a pair of opposing guiding rails and a pair of aligned lateral pins, wherein the controlling member is configured to receive a substantial part of the upper portion of said secondary connecting rod, wherein the substantial part of the upper portion of said secondary connecting rod is configured to slide inside said controlling member in a reciprocating motion; and
a controlling member support element configured to enclose the controlling member within a cylinder block of said engine, the controlling member support element comprising two aligned lateral openings configured to receive the pair of aligned lateral pins of the controlling member,
wherein the upper and lower portions of the secondary connecting rod are configured to engage a joint of the crank shaft within a circular opening formed by a mating of the upper and lower portions of said secondary connecting rod, wherein the piston, the primary connecting rod, the secondary connecting rod, the controlling member, and the controlling member support element are enclosed in the cylinder block of the engine.

In aspects of the present disclosure, the upper portion of the secondary connecting rod of the vehicle's engine may include an elongated member having a pair of aligned pins, wherein the pair of aligned pins may be inserted in second openings of the pair of primary connecting rods, wherein the upper portion of the secondary connecting rod may include two vertical extrusions that form a first semi-circular space gap between said vertical extrusions, and wherein the lower portion of the secondary connecting rod may include two parallel vertical extrusions that form a second semi-circular space gap between said parallel vertical extrusions, wherein the first and second semi-circular space gaps form the circular opening when the upper and lower portions of the secondary connecting rod are mated.

In aspects of the present disclosure, each of the two aligned lateral openings of said controlling member support element in the vehicle's engine may include a trapezoidal opening with a semi-circular cut formed in proximity of a middle point of a base of said trapezoidal opening, wherein the controlling member support element may further include a pair of fixing elements each having a trapezoidal shape with a semi-circular cut formed in proximity of a middle point of a base of said trapezoidal shape, wherein two circular openings are formed when the fixing elements are inserted inside said lateral openings of the controlling member support element, wherein the circular openings are configured to receive the pair of aligned lateral pins of said controlling member to form a pair of aligned lateral pin joints, wherein the circular openings of said controlling member support element and the pair of aligned lateral pin joints of the controlling member may be configured to allow for an oscillation of said controlling member.

BRIEF DESCRIPTION OF THE DRAWINGS

The disclosure will now be described with reference to the accompanying drawings, which illustrate embodiments of the present disclosure, without restricting the scope of the disclosure, and in which.

DETAILED DESCRIPTION

Figure 1:
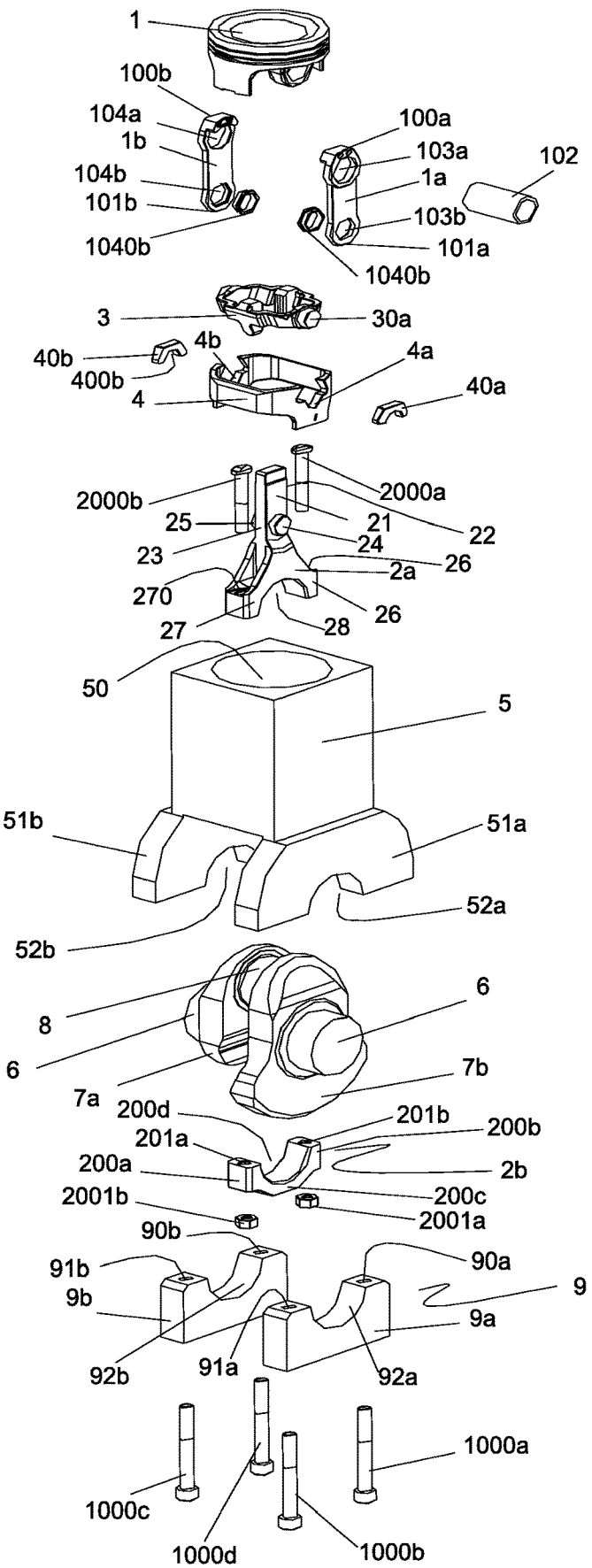
FIG. 1 illustrates an exploded view of a transmission assembly for an engine configured in accordance with embodiments of the present disclosure.

FIGS. 1-10 illustrate a transmission assembly that transforms a linear reciprocating motion of a piston to an angular movement of a crank shaft, and that can fit inside a set of confined dimensions of a conventional cylinder block without altering the position of the crankshaft, while allowing for better torque conversion near the top dead center in the down stroke without compromising the engine's dimensions, wherein the transmission assembly is configured in accordance with embodiments of the present disclosure.

In accordance with embodiments of the present disclosure, the transmission assembly includes a pair of primary connecting rods 1a and 1b, wherein each may be connected from a first end 100a and 100b, respectively, to a piston head 1, and from a second end 101a and 101b to a secondary connecting rod 2 (e.g., see FIG. 5), wherein the connection to the piston head 1 may be achieved by a single degree-of-freedom joint, such as formed by a mating of the pin 102 with a corresponding hole formed in an underneath surface of the piston head 1.

Figure 2:
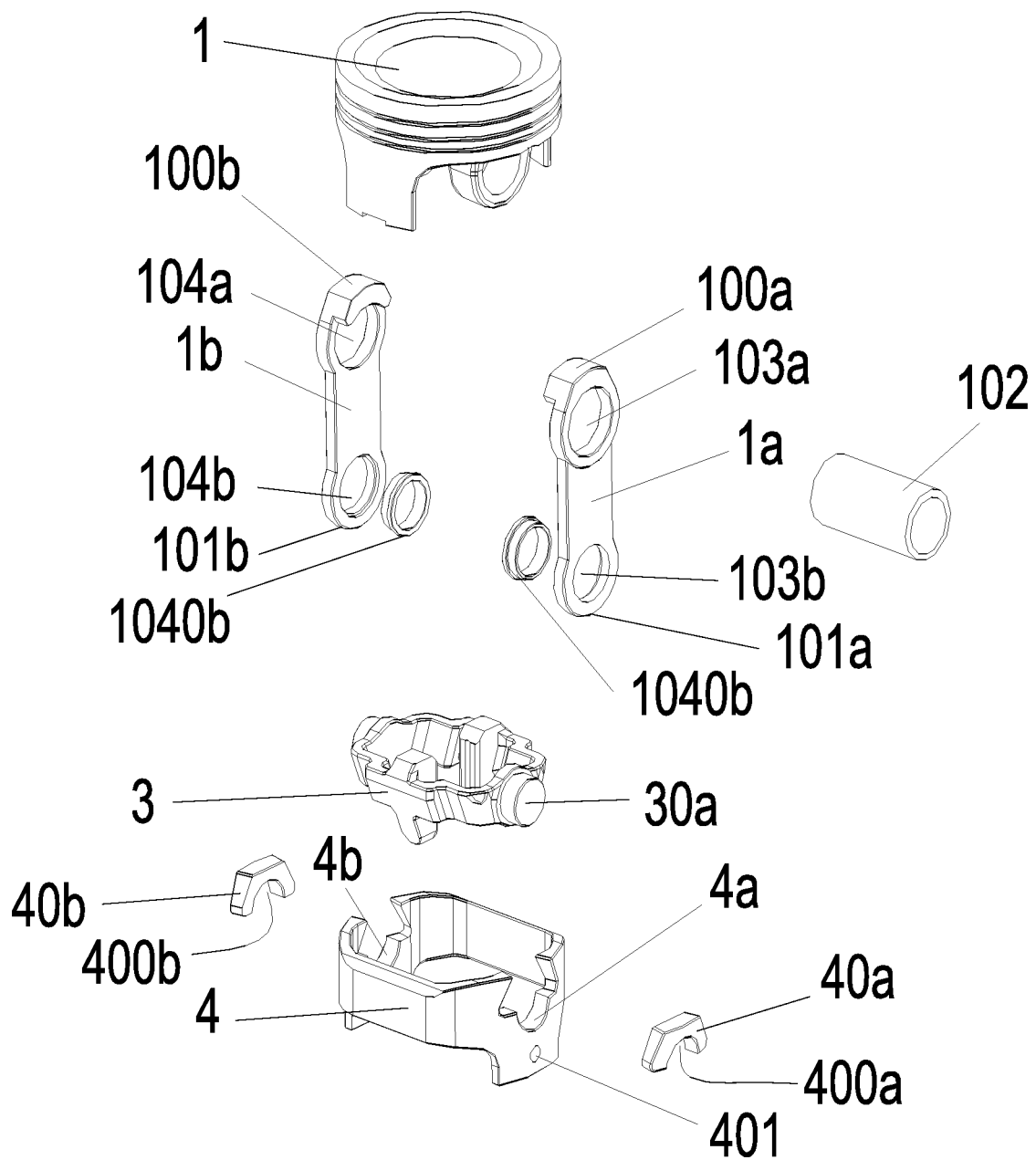
FIG. 2 illustrates an exploded view of a piston, primary connecting rods, controlling member, and controlling member support element of a transmission assembly for an engine configured in accordance with embodiments of the present disclosure.

Each of the primary connecting rods 1a and 1b may have a pair of circular openings 103a, 103b and 104a, 104b, respectively, wherein the openings 103b and 104b are in proximity to lower ends of the primary connecting rods 1a and 1b, respectively (e.g., see FIG. 2).

In embodiments of the present disclosure, the secondary connecting rod 2 may include an upper portion 2a and a lower portion 2b that are separable from each other. The upper portion 2a of the secondary connecting rod 2 may include an elongated member 21 having two parallel opposed sides 22 and 23 with two laterally aligned pins 24 and 25 extending laterally outwardly from such an elongated member 21. The upper portion 2a of the secondary connecting rod 2 may also include two vertical extrusions 26 and 27 pointing downwards and defining a semi-circular space gap 28 between them, each of such vertical extrusions 26 and 27 may have a pass-through hole 260 and 270, respectively.

In embodiments of the present disclosure, the circular openings 103b and 104b are configured to receive the pins 24 and 25, respectively, thereby forming pin joints.

In embodiments of the present disclosure, the lower portion 2b may include two substantially parallel vertical extrusions 200a and 200b, each with a respective pass-through hole 201a and 201b, respectively. Such vertical extrusions 200a and 200b may be spaced apart and connected by a curved member 200c that defines a semi-circular space gap 200d between such vertical extrusions 200a and 200b.

The pass-through holes 260 and 201b may be aligned to each other, and the pass-through holes 270 and 201a may be aligned to each other as well.

Figure 6:
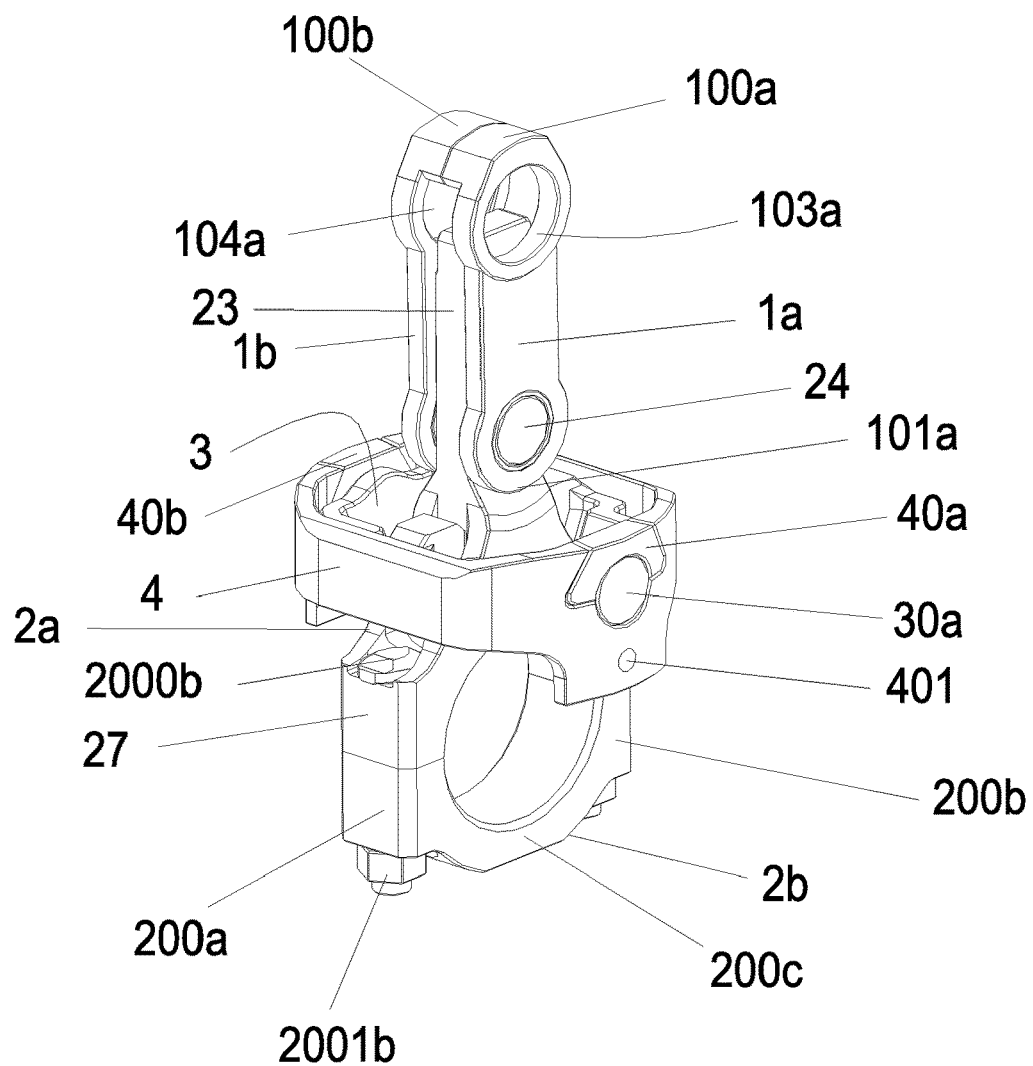
FIG. 6 illustrates a perspective view of a pair of primary connecting rods connected to a secondary connecting rod of a transmission assembly for an engine configured in accordance with embodiments of the present disclosure.
Figure 7:
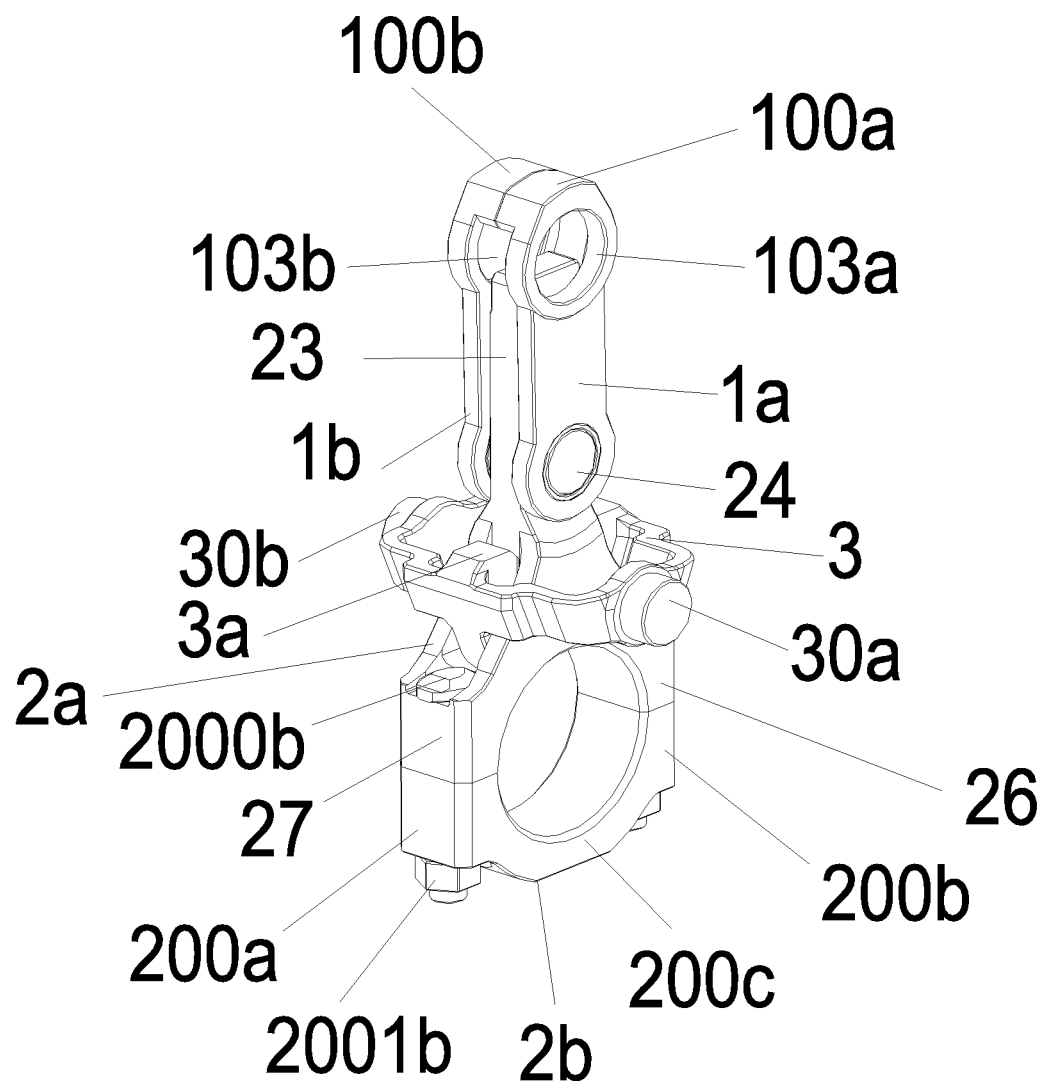
FIG. 7 illustrates a perspective view of a pair of primary connecting rods connected to a secondary connecting rod that slides inside a controlling member of a transmission assembly for an engine configured in accordance with embodiments of the present disclosure.
Figure 8:
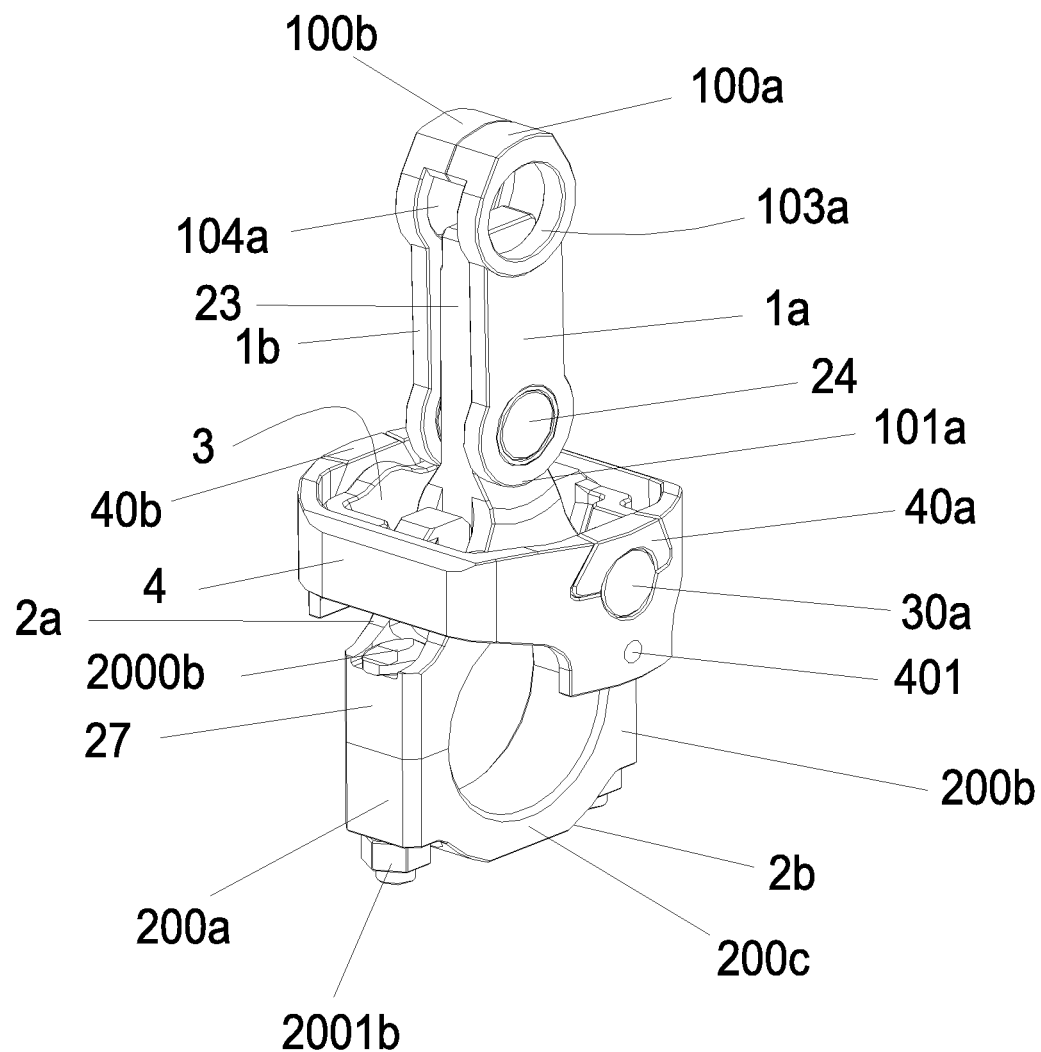
FIG. 8 illustrates a perspective view of a pair of primary connecting rods connected to a secondary connecting rod that is connected to a controlling member, the controlling member being connected to a controlling member support element of a transmission assembly for an engine configured in accordance with embodiments of the present disclosure.

The diameters of the semi-circular space gaps 28 and 200d may be substantially similar, wherein such gaps 28 and 200d form a substantially circular opening when the upper and lower portions 2a and 2b are connected with each other (e.g., see FIG. 6). Such a connection between the upper and lower portions 2a and 2b may be achieved by any suitable connection means, such as inserting a pair of bolts 2000a and 2000b, each through a pair of aligned holes 260, 201b, and 270, 201a, respectively, and securing each of such bolts 2000a and 2000b with nuts 2001a and 2001b, respectively.

Figure 10:
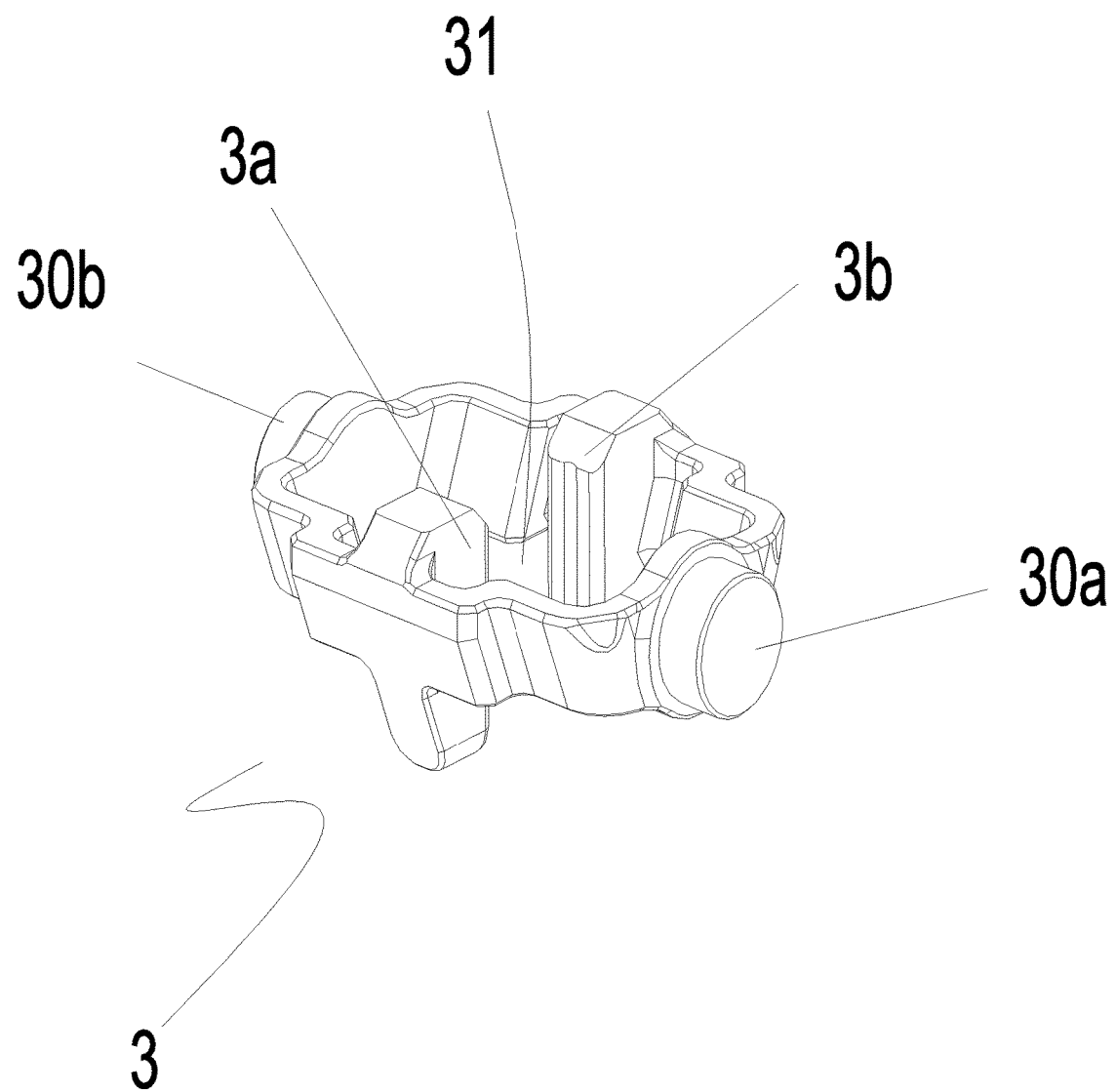
FIG. 10 illustrates a perspective view of a controlling member of a transmission assembly for an engine configured in accordance with embodiments of the present disclosure.

Referring to FIG. 10, the assembly may further include a controlling member 3, which has two opposed guiding rails 3a and 3b extending inwardly along such controlling member 3 with a space gap 31 defined between such rails 3a and 3b. The controlling member 3 may also include a pair of substantially coaxially aligned pins 30a and 30b extending laterally outwardly from the controlling member 3 in a substantially perpendicular direction to the two guiding rails 3a and 3b.

Figure 9:
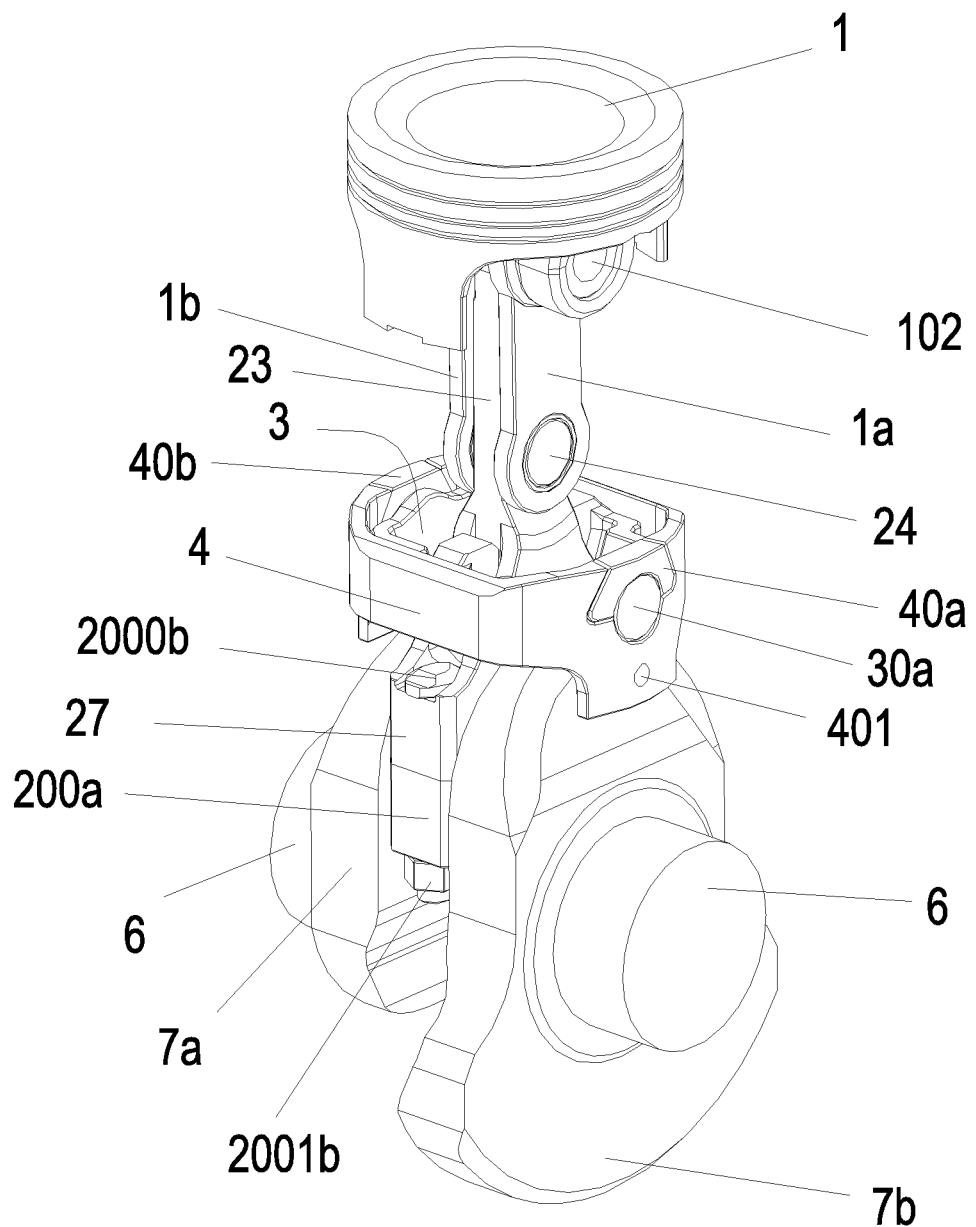
FIG. 9 illustrates a perspective view of a transmission assembly for an engine configured in accordance with embodiments of the present disclosure, the assembly being separated from the cylinder block.
Figure 11:
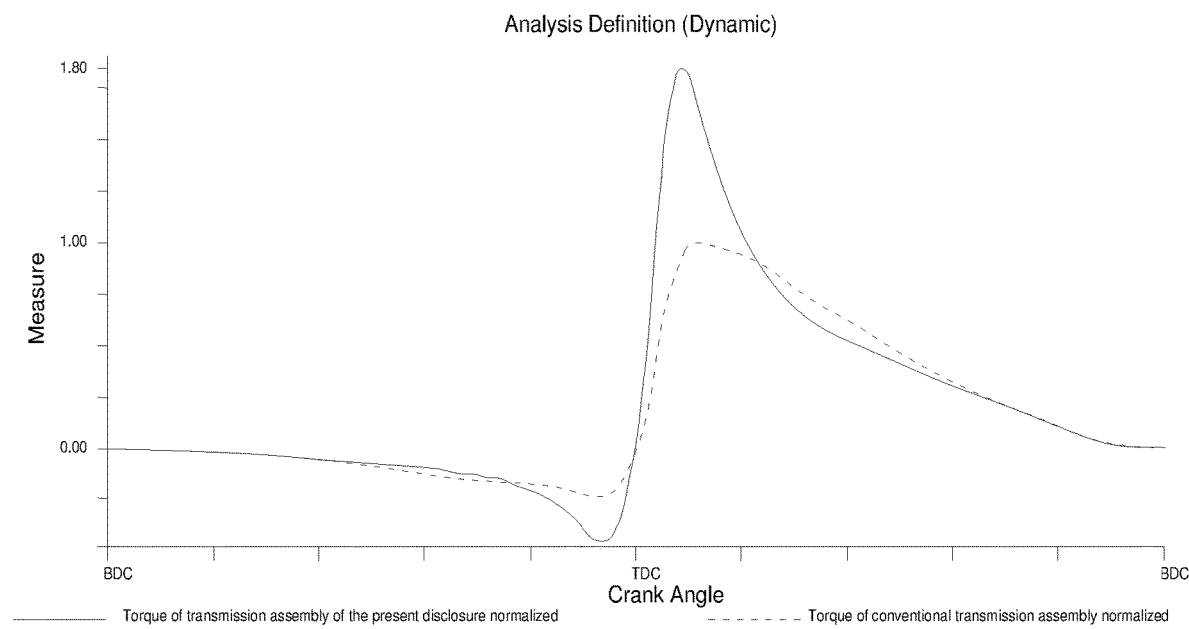
FIG. 11 illustrates a plot comparing a torque produced by a transmission assembly configured in accordance with embodiments of the present disclosure and a torque produced by a conventional transmission assembly.

Referring to FIG. 9, one of the guiding rails 3a may be configured to facilitate force transmission from the pair of primary connecting rods 1a and 1b to a crankshaft 6 in the downward stroke of the piston head 1. This is since the guiding rails 3a and 3b, in accordance with embodiments of the present disclosure, passively control the additional degree of freedom provided by the addition of the secondary connecting rod 2, thus introducing a faster piston speed near Top Dead Center (TDC) of the cylinder block. It is known that in any slider-crank machine, the highest torque occurs at a highest sliding speed and vice-versa. This implies that the high piston speed near TDC makes a clear torque advantage by converting the combustion of the high pressure gasses at top dead center more effectively and efficiently into torque of the crank shaft 6. The increase in torque at the TDC is illustrated in FIG. 11. FIG. 11 shows the difference of torque for one piston cycle (from Bottom Dead Center (BDC) to TDC to BDC) as a result of the difference in how mechanical arrangement in converting the available gas forces into a useful torque especially near TDC when high pressure introduced by combustion. The mechanical advantage of the present disclosure over the traditional slider-crank is achieved by converting more out of the available gas forces just after TDC by optimized fast piston motion, thus producing more torque compared to traditional slider-crank.

Referring to FIG. 2, for example, in accordance with embodiments of the present disclosure, the transmission assembly may further include a controlling member support element 4 with two substantially similar curved openings 4a and 4b, wherein each of such openings 4a and 4b may have a substantially trapezoidal profile combined with a semi-circular cut in proximity to a middle point of a base of the substantially trapezoidal profile. Each of the curved openings 4a and 4b may have a corresponding fixing element 40a and 40b, respectively, which are moveable laterally outwardly from the substantially trapezoidal portion of the openings 4a and 4b. Each of the fixing elements 40a and 40b may have a substantially trapezoidal shape with a substantially semi-circular cut 400a and 400b near a midpoint of a base of the substantially trapezoidal shape. Such fixing elements 40a and 40b may be configured to fit into the substantially trapezoidal portion of the openings 4a and 4b. In embodiments of the present disclosure, the semi-circular cuts 400a and 400b of the fixing elements 40a and 40b, respectively, and the semi-circular portions of the openings 4a and 4b may have similar diameters, wherein such similar diameters may form two coaxially aligned circular openings configured to receive the pins 30a and 30b of the controlling member 3 to form pin joints when the fixing elements 40a and 40b are inserted in the openings 4a and 4b, respectively (e.g., see FIGS. 8-9).

It is appreciated that a function of the substantially trapezoidal portions of the openings 4a and 4b along with the substantially trapezoidal shapes of the fixing elements 40a and 40b is to secure the pins 30a and 30b, respectively, of the controlling member 3 inside the engine's cylinder block 5. Therefore, in other embodiments, other profiles and shapes may be considered such as, but not limited to an inverted Y-shape, etc.

The controlling member support element 4 may be inserted inside a cylinder block 5 of an IC engine and may have a fixing mechanism 401 that helps in keeping such support element 4 static inside the cylinder block 5. Such a fixing mechanism 401 may include, but not limited to, a bolt that can be tightened up against an inside of the cylinder block 5 using a ratchet or an Allen key.

In embodiments of the present invention, the two pins 30a and 30b may be positioned on the semi-circular portions of the substantially similar curved openings 4a and 4b prior to the insertion of the fixing members 40a, 40b inside the substantially trapezoidal portions of such openings 4a, 4b.

Figure 3:
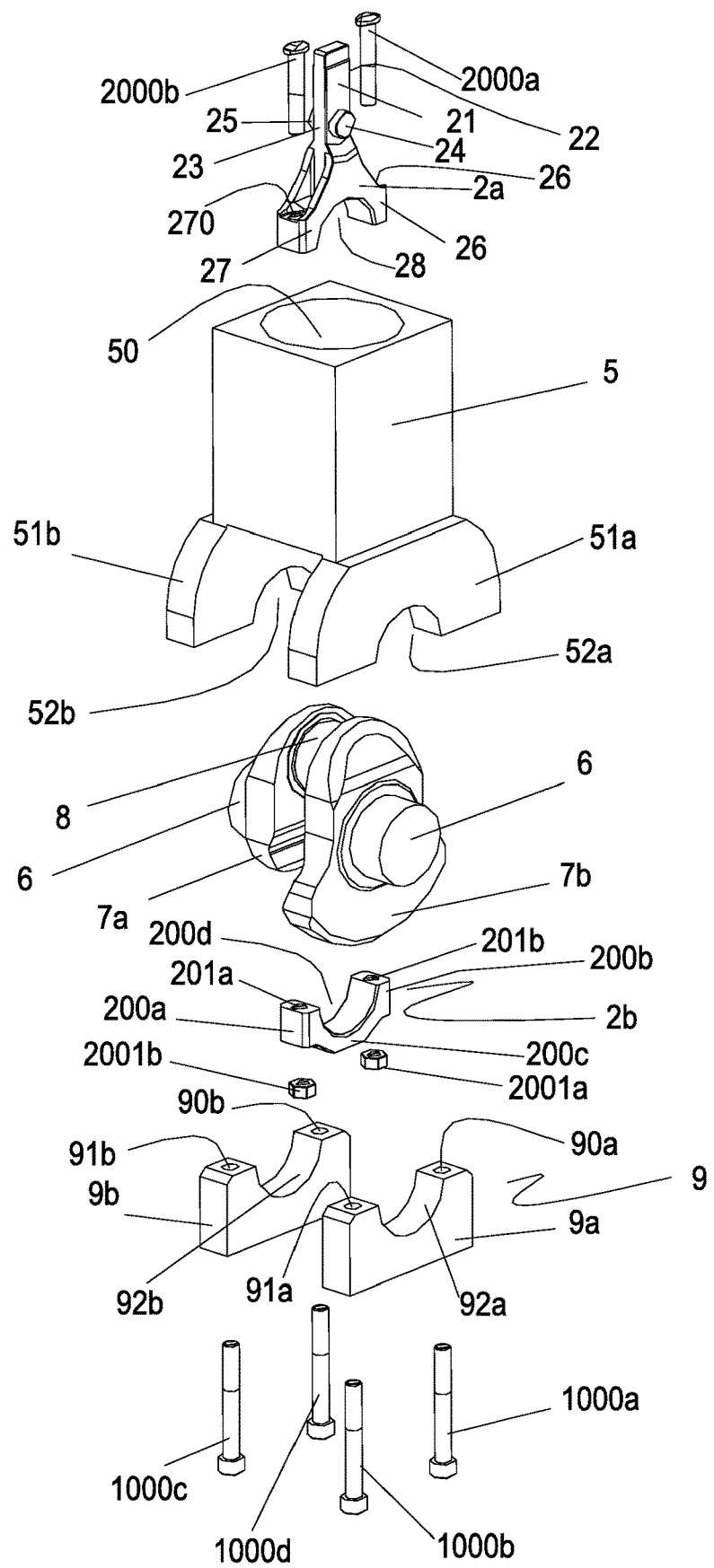
FIG. 3 illustrates an exploded view of a secondary connecting rod, an exemplary cylinder block, and an exemplary crank shaft of a transmission assembly for an engine configured in accordance with embodiments of the present disclosure.

Referring to FIGS. 1 and 3, in accordance with embodiments of the present disclosure, the transmission assembly may further include a crank shaft 6 laterally extending from a pair of mushroom-shaped counterweights 7a and 7b, wherein such counterweights are connected to each other by means of a crank shaft joint 8.

The circular space gap formed by connecting the upper and lower portions 2a and 2b of the secondary connecting rod 2 (i.e., formed by mating the two semi-circular space gaps 28 and 200d) may be configured to receive the crank shaft joint 8.

The cylinder block 5 may include an opening 50 (e.g., see, for example, FIG. 1) configured to receive the piston head 1, the primary connecting rods 1a and 1b, the controlling member 3, the controlling member support element 4, and the secondary connecting rod 2. The cylinder block 5 may include a pair of vertically extruding members 51a and 51b pointing downwards, wherein each of such extruding members 51a and 51b has a semi-circular cut 52a and 52b, respectively, and a pair of parallel holes formed therein (not shown).

Referring to FIG. 3, in accordance with embodiments of the present disclosure, the transmission assembly may further include a pair of cylinder caps 9, wherein each of such caps 9a and 9b corresponds to one of the vertically extruding members 51a and 51b, respectively, and may include a pair of pass-through parallel holes 90a, 91a, and 90b, 91b, respectively, and a semi-circular cuts 92a and 92b, respectively.

Figure 4:
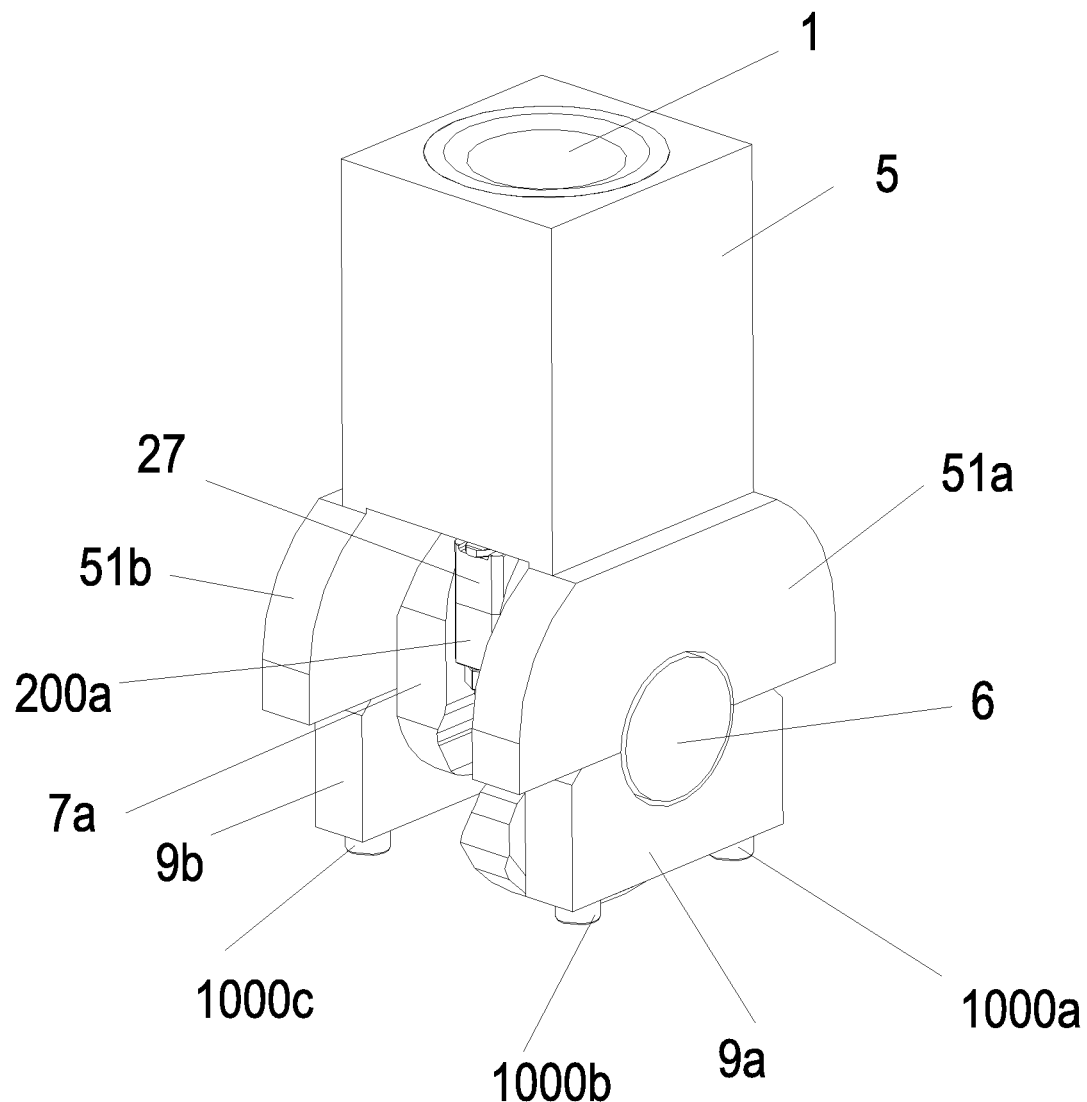
FIG. 4 illustrates a perspective view of a transmission assembly for an engine configured in accordance with embodiments of the present disclosure, the assembly being enclosed in an exemplary cylinder block.
Figure 5:
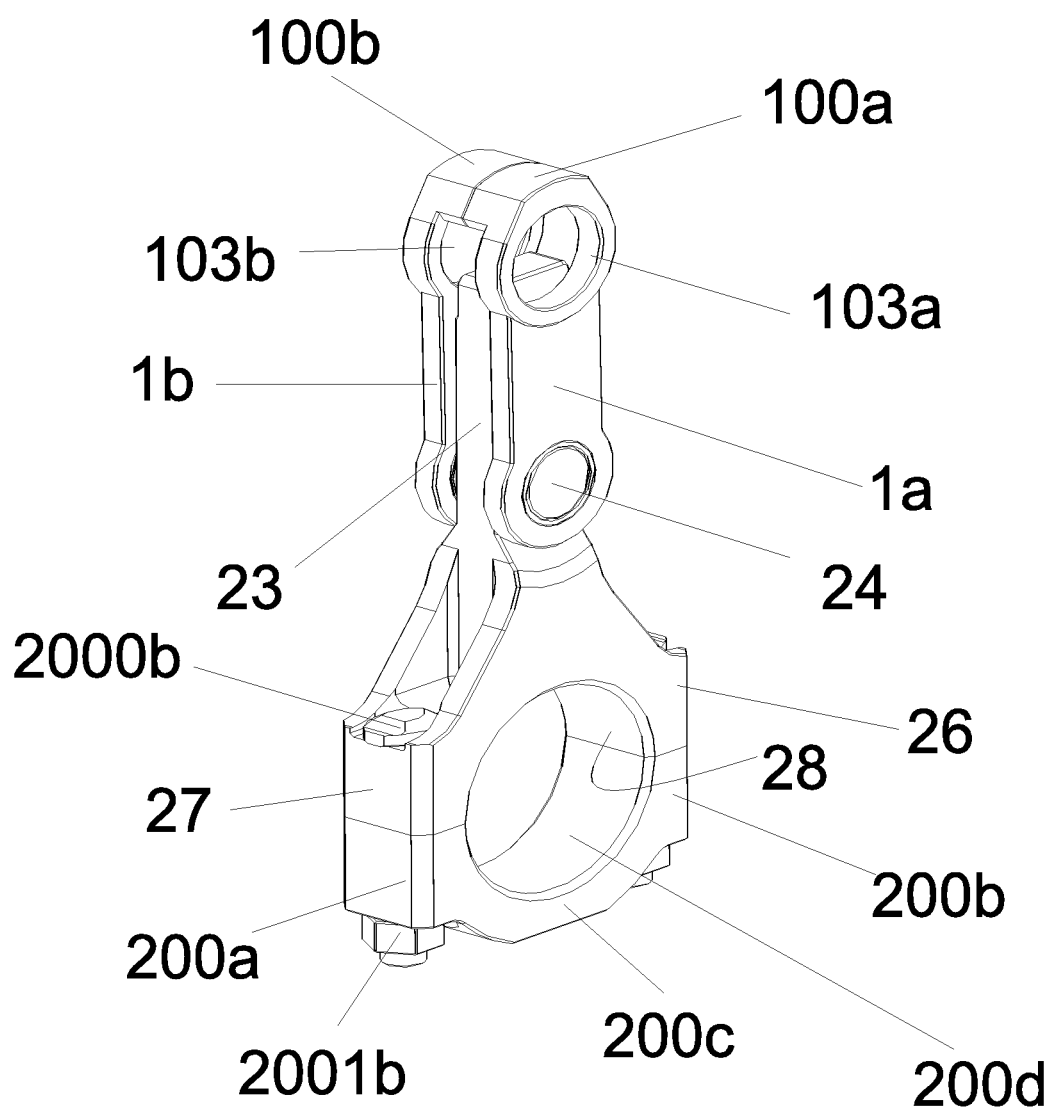
FIG. 5 illustrates a perspective view of secondary connecting rod of a transmission assembly for an engine configured in accordance with embodiments of the present disclosure.

In embodiments of the present disclosure, the holes of the vertically extruding members 51a and 51b and the pass-through holes 90a, 91a and 90b, 91b of the corresponding cylinder caps 9a and 9b may be aligned, wherein the cylinder caps 9a and 9b may be connected to the vertically extruding members 51a and 51b by any suitable connecting mechanism, such as bolts 1000a, 1000b, 1000c, and 1000d. The semi-circular cuts 52a, 92a and 52b, 92b may each form a circular opening when the cylinder caps 9a and 9b are connected to the vertically extruding members 51a and 51b, wherein such circular openings are configured to receive each end of the engine's crank shaft 6, such as illustrated in FIG. 4.

The elongated member 21 of the upper portion 2a of the secondary connecting rod 2 may be configured to reciprocate inside the space gap 31 of the controlling member 3 on the guiding rails 3a and 3b.

The controlling member 3 may be configured to oscillate about a central axis formed by the aligned pin joints 30a and 30b in a confined angle inside the controlling member support element 4.

In embodiments of the present disclosure, the oscillation of the controlling member 3 along with the reciprocation of the secondary connecting rod 2 may translate the reciprocating motion of the piston 1 to a rotation of the crank shaft 6, the counterweights 7a and 7b, and the crankshaft joint 8.

It should be appreciated that the dimensions of all the above-mentioned components may be configured to allow the insertion of the piston 1, the primary connecting rods 1a and 1b, the controlling member 3, the controlling member support element 4, and the secondary connecting rod 2 inside the cylinder block 5; and may be configured to allow for the oscillation of the controlling member 3, the rotation of the counter weights 7a and 7b, the crankshaft joint 8, and the crankshaft 6; and for the reciprocation of the piston 1 and the secondary connecting rod 2.

In embodiments of the present disclosure, the piston 1 may have less lateral surface area in comparison with conventional pistons, since the piston in the present disclosure may have lateral cuts. Such decrease in lateral surface area improves efficiency and lateral forces.

Figure 12:
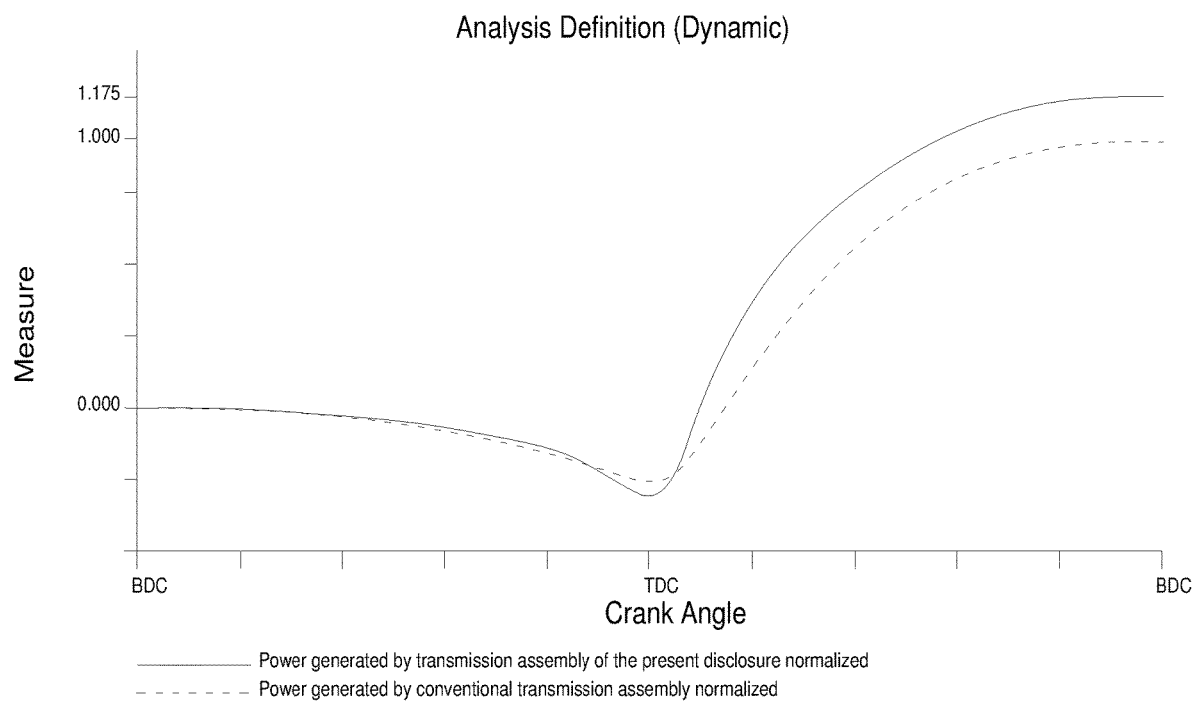
FIG. 12 illustrates a plot comparing power generated by a transmission assembly configured in accordance embodiments of the present disclosure and power generated by a conventional transmission assembly.

Referring to FIG. 12, the difference in generated power as a result of the torque produced for one cycle (from BDC to TDC to BDC) is illustrated. The Figure gives an approximation for the net improvement of the power produced by mechanical advantage of the present disclosure, which is about 17.5%.

Figure 13:
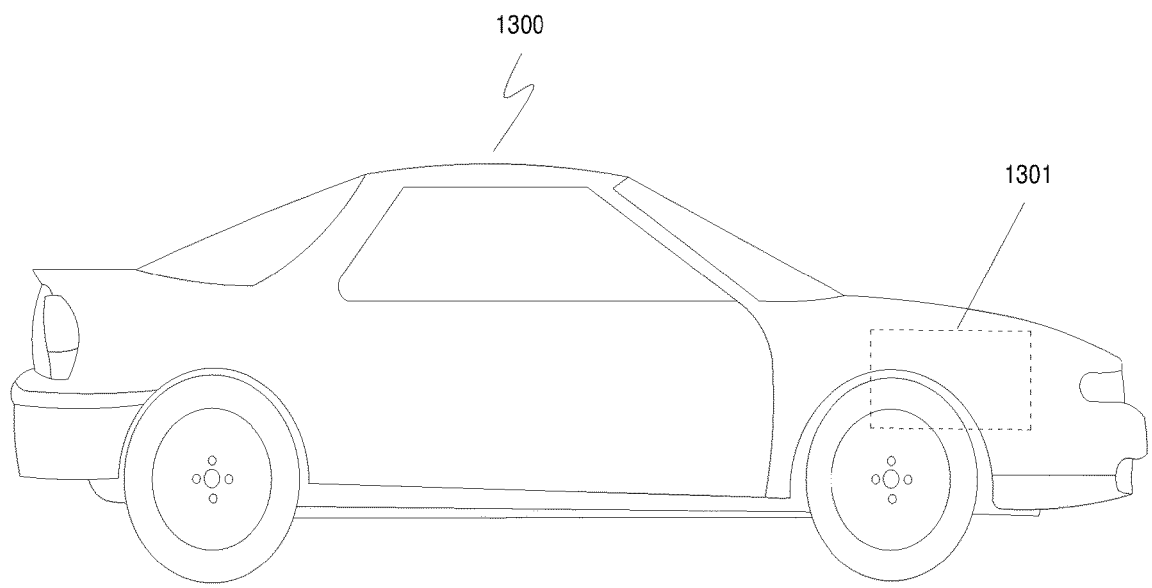
FIG. 13 illustrates an exemplary vehicle that includes an engine configured in accordance with embodiments of the present disclosure.

Referring to FIG. 13, there is illustrated an exemplary vehicle 1300 that includes an engine 1301 suitable for driving wheels of the vehicle, wherein the engine 1301 is configured in accordance with embodiments of the present disclosure, wherein the engine 1301 implements the transmission assembly described herein with respect to FIGS. 1-12.

The use of the term "and" in the claims is used to mean "and/or" unless explicitly indicated to refer to a collective nature only. The singular forms "a," "an," and "the" include plural referents unless the context clearly dictates otherwise.

As used herein with respect to an identified property or circumstance, "substantially" refers to a degree of deviation that is sufficiently small so as to not measurably detract from the identified property or circumstance. The exact degree of deviation allowable may in some cases depend on the specific context.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a defacto equivalent of any other member of the same list solely based on their presentation in a common group without indications to the contrary.

Unless defined otherwise, all technical and scientific terms used herein have the same meaning as commonly understood to one of ordinary skill in the art to which the presently disclosed subject matter belongs. Although any methods, devices, and materials similar or equivalent to those described herein can be used in the practice or testing of the presently disclosed subject matter, representative methods, devices, and materials are now described.

While the present disclosure has been made in detail and with reference to specific embodiments, it will be apparent to those skilled in the art that various additions, omissions, or amendments can be made without departing from the scope and spirit thereof.

What is claimed is:

1. An assembly for an engine configured for linking a piston head to a crankshaft of the engine, the assembly comprising:
   a primary connecting rod configured to hingeably connect to said piston head;
   a secondary connecting rod comprising an upper portion and a lower portion, wherein the upper portion comprises an elongated member having a pin to hingeably connect the upper portion to the primary connecting rod by inserting such pin in an opening of the primary connecting rod,
   a controlling member having a pair of opposing guiding rails and a pair of aligned lateral pins, wherein the controlling member is configured to receive a substantial part of the upper portion of said secondary connecting rod; and
   a controlling member support element configured to enclose the controlling member within a cylinder block of said engine, the controlling member support element comprising two aligned lateral openings configured to receive the pair of aligned lateral pins of the controlling member, wherein each of the two aligned lateral openings of said controlling member support element comprises a trapezoidal opening with a semi-circular cut formed in proximity of a middle point of a base of said trapezoidal opening,
   wherein the upper and lower portions of the secondary connecting rod are configured to engage a crank shaft joint between a circular opening formed by a mating of the upper and lower portions of said secondary connecting rod.

2. The assembly of claim 1, wherein the upper portion of the secondary connecting rod comprises two vertical extrusions that form a first semi-circular space gap between said vertical extrusions, and wherein the lower portion of the secondary connecting rod comprises two parallel vertical extrusions that form a second semi-circular space gap between said parallel vertical extrusions, wherein the first and second semi-circular space gaps form the circular opening when the upper and lower portions of the secondary connecting rod are mated.

3. The assembly of claim 1, wherein the substantial part of the secondary connecting rod upper portion is configured to slide inside said controlling member in a reciprocating motion.

4. The assembly of claim 1, wherein the controlling member support element further comprises a pair of fixing elements each having a trapezoidal shape with a semi-circular cut formed in proximity of a middle point of a base of said trapezoidal shape.

5. The assembly of claim 4, wherein two circular openings are formed when the fixing elements are inserted inside said lateral openings of the controlling member support element, wherein the circular openings are configured to receive the pair of aligned lateral pins of said controlling member to form a pair of aligned lateral pin joints.

6. The assembly of claim 5, wherein the circular openings of said controlling member support element and the pair of aligned lateral pin joints of the controlling member are configured to allow for an oscillation of said controlling member.

7. The assembly of claim 1, wherein the piston head, the primary connecting rod, the secondary connecting rod, the controlling member, the controlling member support element, and the crank shaft joint are enclosed in an engine cylinder block.

8. An assembly for an engine configured for linking a piston head to a crankshaft of the engine, the assembly comprising:
   a primary connecting rod configured to hingeably connect to said piston head;
   a secondary connecting rod comprising an upper portion and a lower portion, wherein the upper portion comprises an elongated member having a pin to hingeably connect the upper portion to the primary connecting rod by inserting such pin in an opening of the primary connecting rod,
   a controlling member having a pair of opposing guiding rails and a pair of aligned lateral pins, wherein the controlling member is configured to receive a substantial part of the upper portion of said secondary connecting rod; and
   a controlling member support element configured to enclose the controlling member within a cylinder block of said engine, the controlling member support element comprising two aligned lateral openings configured to receive the pair of aligned lateral pins of the controlling member, wherein the upper and lower portions of the secondary connecting rod are configured to engage a crank shaft joint between a circular opening formed by a mating of the upper and lower portions of said secondary connecting rod, wherein the piston head, the primary connecting rod, the secondary connecting rod, the controlling member, the controlling member support element, and the crank shaft joint are enclosed in an engine cylinder block, wherein the controlling member support element further comprises a fixing mechanism configured to affix the controlling member support element to an inside surface of said engine cylinder block.

9. An assembly for an engine configured for linking a piston head to a crankshaft of the engine, the assembly comprising:
 a primary connecting rod configured to hingeably connect to said piston head;
 a secondary connecting rod comprising an upper portion and a lower portion, wherein the upper portion comprises an elongated member having a pin to hingeably connect the upper portion to the primary connecting rod by inserting such pin in an opening of the primary connecting rod,
 a controlling member having a pair of opposing guiding rails and a pair of aligned lateral pins, wherein the controlling member is configured to receive a substantial part of the upper portion of said secondary connecting rod; and
 a controlling member support element configured to enclose the controlling member within a cylinder block of said engine, the controlling member support element comprising two aligned lateral openings configured to receive the pair of aligned lateral pins of the controlling member,
 wherein the upper and lower portions of the secondary connecting rod are configured to engage a crank shaft joint between a circular opening formed by a mating of the upper and lower portions of said secondary connecting rod, wherein the piston head, the primary connecting rod, the secondary connecting rod, the controlling member, the controlling member support element, and the crank shaft joint are enclosed in an engine cylinder block, wherein the controlling member support element further comprises a fixing mechanism configured to affix the controlling member support element inside said engine cylinder block,
 wherein said fixing mechanism comprises a bolt configured to be tightened against said engine cylinder block.

10. An engine comprising:
 a piston;
 a crankshaft; and
 a transmission assembly linking the piston to the crankshaft, wherein the transmission assembly comprises:
  a pair of primary connecting rods, each with a first opening configured to hingeably connect to said piston;
  a secondary connecting rod comprising an upper portion and a lower portion, wherein the upper portion comprises an elongated member having a pair of aligned pins, wherein the pair of aligned pins is inserted in second openings of the pair of primary connecting rods to hingeably connect the upper portion to said pair of primary connecting rods;
  a controlling member having a pair of opposing guiding rails and a pair of aligned lateral pins, wherein the controlling member is configured to receive a substantial part of the upper portion of said secondary connecting rod, wherein the substantial part of the upper portion of said secondary connecting rod is configured to slide inside said controlling member in a reciprocating motion; and
  a controlling member support element configured to enclose the controlling member within a cylinder block of said engine, the controlling member support element comprising two aligned lateral openings configured to receive the pair of aligned lateral pins of the controlling member,
  wherein the upper and lower portions of the secondary connecting rod are configured to engage a joint of the crank shaft within a circular opening formed by a mating of the upper and lower portions of said secondary connecting rod, wherein the piston, the primary connecting rod, the secondary connecting rod, the controlling member, and the controlling member support element are enclosed in the cylinder block of the engine,
  wherein the upper portion of the secondary connecting rod comprises two vertical extrusions that form a first semi-circular space gap between said vertical extrusions, and wherein the lower portion of the secondary connecting rod comprises two parallel vertical extrusions that form a second semi-circular space gap between said parallel vertical extrusions, wherein the first and second semi-circular space gaps form the circular opening when the upper and lower portions of the secondary connecting rod are mated.

11. The engine of claim 10, wherein each of the two aligned lateral openings of said controlling member support element comprises a trapezoidal opening with a semi-circular cut formed in proximity of a middle point of a base of said trapezoidal opening, wherein the controlling member support element further comprises a pair of fixing elements each having a trapezoidal shape with a semi-circular cut formed in proximity of a middle point of a base of said trapezoidal shape, wherein two circular openings are formed when the fixing elements are inserted inside said lateral openings of the controlling member support element, wherein the circular openings are configured to receive the pair of aligned lateral pins of said controlling member to form a pair of aligned lateral pin joints, wherein the circular openings of said controlling member support element and the pair of aligned lateral pin joints of the controlling member are configured to allow for an oscillation of said controlling member.

12. The engine of claim 11, wherein the controlling member support element further comprises a fixing mechanism configured to affix the controlling member support element inside the cylinder block of the engine.

13. A vehicle comprising:
 one or more wheels; and
 an engine suitable for driving the one or more wheels of the vehicle, wherein the engine comprises:
  a piston;
  a crankshaft; and
  a transmission assembly linking the piston to the crankshaft, wherein the transmission assembly comprises:
   a pair of primary connecting rods, each with a first opening configured to hingeably connect to said piston;

a secondary connecting rod comprising an upper portion and a lower portion, wherein the upper portion comprises an elongated member having a pair of aligned pins, wherein the pair of aligned pins is inserted in second openings of the pair of primary connecting rods to hingeably connect the upper portion to said pair of primary connecting rods;

a controlling member having a pair of opposing guiding rails and a pair of aligned lateral pins, wherein the controlling member is configured to receive a substantial part of the upper portion of said secondary connecting rod, wherein the substantial part of the upper portion of said secondary connecting rod is configured to slide inside said controlling member in a reciprocating motion; and a controlling member support element configured to enclose the controlling member within a cylinder block of said engine, the controlling member support element comprising two aligned lateral openings configured to receive the pair of aligned lateral pins of the controlling member, wherein the upper and lower portions of the secondary connecting rod are configured to engage a joint of the crank shaft within a circular opening formed by a mating of the upper and lower portions of said secondary connecting rod, wherein the piston, the primary connecting rod, the secondary connecting rod, the controlling member, and the controlling member support element are enclosed in the cylinder block of the engine, wherein the pair of aligned pins is inserted in second openings of the pair of primary connecting rods, wherein the upper portion of the secondary connecting rod comprises two vertical extrusions that form a first semi-circular space gap between said vertical extrusions, and wherein the lower portion of the secondary connecting rod comprises two parallel vertical extrusions that form a second semi-circular space gap between said parallel vertical extrusions, wherein the first and second semi-circular space gaps form the circular opening when the upper and lower portions of the secondary connecting rod are mated.

14. The engine of claim 13, wherein each of the two aligned lateral openings of said controlling member support element comprises a trapezoidal opening with a semi-circular cut formed in proximity of a middle point of a base of said trapezoidal opening, wherein the controlling member support element further comprises a pair of fixing elements each having a trapezoidal shape with a semi-circular cut formed in proximity of a middle point of a base of said trapezoidal shape, wherein two circular openings are formed when the fixing elements are inserted inside said lateral openings of the controlling member support element, wherein the circular openings are configured to receive the pair of aligned lateral pins of said controlling member to form a pair of aligned lateral pin joints, wherein the circular openings of said controlling member support element and the pair of aligned lateral pin joints of the controlling member are configured to allow for an oscillation of said controlling member.

* * * * *